(12) United States Patent
Lattard et al.

(10) Patent No.: US 7,421,007 B2
(45) Date of Patent: Sep. 2, 2008

(54) TRANSMISSION/RECEPTION DIGITAL CIRCUIT IN CDMA SYSTEM

(75) Inventors: Didier Lattard, Rencurel (FR);
Jean-Rene Lequepeys, Fontaine (FR);
Didier Varreau,
Saint-Georges-de-Commiers (FR);
Laurent Ouvry, Grenoble (FR)

(73) Assignee: Commissariat a l'Energie Atomique, Paris (FR)

( * ) Notice: Subject to any disclaimer, the term of this patent is extended or adjusted under 35 U.S.C. 154(b) by 743 days.

(21) Appl. No.: 10/450,815

(22) PCT Filed: Dec. 27, 2001

(86) PCT No.: PCT/FR01/04214

§ 371 (c)(1),
(2), (4) Date: Jun. 18, 2003

(87) PCT Pub. No.: WO02/054612

PCT Pub. Date: Jul. 11, 2002

(65) Prior Publication Data

US 2004/0022300 A1 Feb. 5, 2004

(30) Foreign Application Priority Data

Dec. 29, 2000 (FR) .................................. 00 17286

(51) Int. Cl.
*H04B 1/69* (2006.01)
*H04B 7/216* (2006.01)
(52) U.S. Cl. ........................... 375/140; 370/342
(58) Field of Classification Search .......... 375/140, 375/130, 222, 344, 348, 145, 219; 370/335, 370/342, 350
See application file for complete search history.

(56) References Cited

U.S. PATENT DOCUMENTS

| 6,005,854 | A | 12/1999 | Xu et al. |
| 6,094,576 | A | 7/2000 | Hakkinen et al. |
| 6,198,731 | B1 * | 3/2001 | Hamada et al. ............. 370/335 |
| 6,212,222 | B1 * | 4/2001 | Okubo et al. ............... 375/149 |
| 6,542,493 | B1 | 4/2003 | Moerder |
| 6,674,788 | B2 | 1/2004 | Lomp et al. |
| 6,771,625 | B1 * | 8/2004 | Beal ........................... 370/336 |
| 6,963,753 | B1 | 11/2005 | Hamabe |
| 2002/0085652 | A1 * | 7/2002 | Okubo et al. ............... 375/344 |

* cited by examiner

*Primary Examiner*—Khai Tran
(74) *Attorney, Agent, or Firm*—Connolly Bove Lodge & Hutz LLP (57) ABSTRACT

The present invention relates to a digital transmitting/receiving circuit (1) intended to be mounted on at least one source and on at least one concentrator exchanging binary symbols with the said sources, the said circuit (1) comprising a transmitter (2) capable of transmitting the said binary symbols and a receiver (4) capable of receiving symbols transmitted by a source, the circuit (1) being characterized in that the transmitter (2) comprises a first module (20) intended to generate at least one binary code for effecting the spectral spreading of symbols to be transmitted and a second module (22) intended to generate at least one internal clock signal for synchronizing the reception of symbols transmitted by a source, and in that the said receiver comprises means (46, 48) for detecting new sources of transmission and means (49) for generating synchronization signals and power control signals corresponding to each new source detected.

22 Claims, 8 Drawing Sheets

TRANSMISSION/RECEPTION DIGITAL CIRCUIT IN CDMA SYSTEM

CROSS-REFERENCE TO RELATED APPLICATION

This application is a National Stage Entry of International Application No. PCT/FR01/04214 filed Dec. 27, 2001, which claims priority to France Patent Application Ser. No. 00/17286 filed Dec. 29, 2000.

TECHNICAL FIELD OF THE INVENTION

The present invention lies in the field of digital transmissions by direct sequence spectrum spreading in a CDMA (Code Division Multiple Access) system, that is, a system for multiple access by synchronous or quasi-synchronous code division.

More particularly, the invention relates to a digital transmitting/receiving circuit intended to be mounted on at least one source and on at least one concentrator exchanging binary symbols with the said source by a CDMA transmission, the said circuit comprising a transmitter capable of transmitting the said binary symbols and a receiver capable of receiving transmitted symbols.

The invention finds application in mobile radiocommunication systems in wireless local area networks, in wireless local subscriber loops, in cable television, etc.

DESCRIPTION OF THE PRIOR ART

A synchronous CDMA system is composed of a set of transmitters, usually termed "modems", and a receiver, usually termed "concentrator". The transmission of information from the modems to the concentrator takes place along a path termed the uplink, and the transmission of information from the concentrator to the modems via a path termed the downlink. Several modems can start an acquisition simultaneously. For the link to be synchronous, the items of information relating to each modem, transmitted on the uplink, have to arrive at the concentrator in a synchronized manner, so that the symbols are superposed and the correlation peaks on the different codes are positioned at the same moment in the symbol window.

During the transmission phase, one or more codes are allocated to each modem in order for them to transmit their information at a rate compatible with its demand. The codes used are perfectly mutually orthogonal, in order for the inter-correlation noise to be null when the codes are synchronized. On reception, the concentrator decodes the received signal by using the same codes as those of the modems in order to extract from them the useful binary information.

A synchronous reception of the transmitted codes necessitates the use of a symbol clock set relative to a predetermined reference clock. The synchronization of the different modems then consists of determining the shift of each transmitted code with respect to the reference clock, and setting the symbol clock relative to the reference clock.

Components are at present commercially available for controlling a synchronous CDMA type link.

There can be mentioned, for example:
the component HFA 3860 of the Harris company;
the component SC2001 of the Sirius Communications company.

The HPA 3860 circuit is essentially oriented toward a point-to-point link and does not comprise specific resources for controlling a link in a synchronous CDMA system.

Furthermore, in the HFA 3860 component, the symbol clock is provided in a transmission preamble associated with the flow of transmitted data. This results in a rate limitation to the extent to which it occupies a portion of the transmission band.

In the SC2001 component, the determination of the correlation peaks on the different codes is effected by an external DSP (Digital Signal Processing) and microprocessor. The use of this circuit is complex, since it does not incorporate all the functions necessary for the control of a synchronous CDMA communication. More particularly, this circuit does not comprise a resource permitting the control of symbol clocks, the demodulation of the received codes, and the calculation of clock shift instructions, and permits treatment of only two codes simultaneously.

An object of the invention is to remedy the abovementioned disadvantages by means of a programmable circuit capable of ensuring all the necessary functions to effect transmission and reception in a synchronous CDMA system and to automatically manage new accesses.

These objects are attained by means of a digital circuit comprising a transmitter for symbols previously spread by a plurality of binary codes and a receiver capable of receiving such symbols, characterized in that the transmitter comprises a first module intended to generate at least one binary code for performing the spectral spreading of the symbols to be transmitted and a second module intended to generate at least one internal clock signal for synchronizing the reception of the symbols transmitted by a source, and in that the said receiver comprises a third module intended to detect new transmission sources and power control signals corresponding to each new source detected.

According to the invention the said receiver comprises an input stage, an acquisition control stage and a traffic control stage, the input stage comprising a block for editing received data, a pulse filter for limiting the received signal spectrum, a filtered data sampling stage, and transmitting filtered data on the one hand to the acquisition control stage, which extracts from the said data, power and time offset information of the received signals with respect to the base clock of the receiver, and on the other hand to the traffic control stage, which extracts from the said data the transmitted binary information and the power and time offset information of the received signals with respect to the base clock of the receiver.

According to the invention, the acquisition control stage comprises a differential demodulation module, a generating module for an acquisition signal representing synchronization signals and power control signals corresponding to each new transmission source, and a processing module for the generated acquisition signal.

According to the invention, the traffic control stage comprises a correlation module for data previously processed with the codes associated with these data, a differential demodulation module for the correlated data, a calculating module intended to determine the synchronization signals and the power control signals corresponding to each new source of transmission detected.

BRIEF DESCRIPTION OF THE DRAWINGS

Other characteristics and advantages of the invention will become apparent from the following description, taken as a non-limiting example, and with reference to the accompanying Figures.

DETAILED DESCRIPTION

Figure 1:
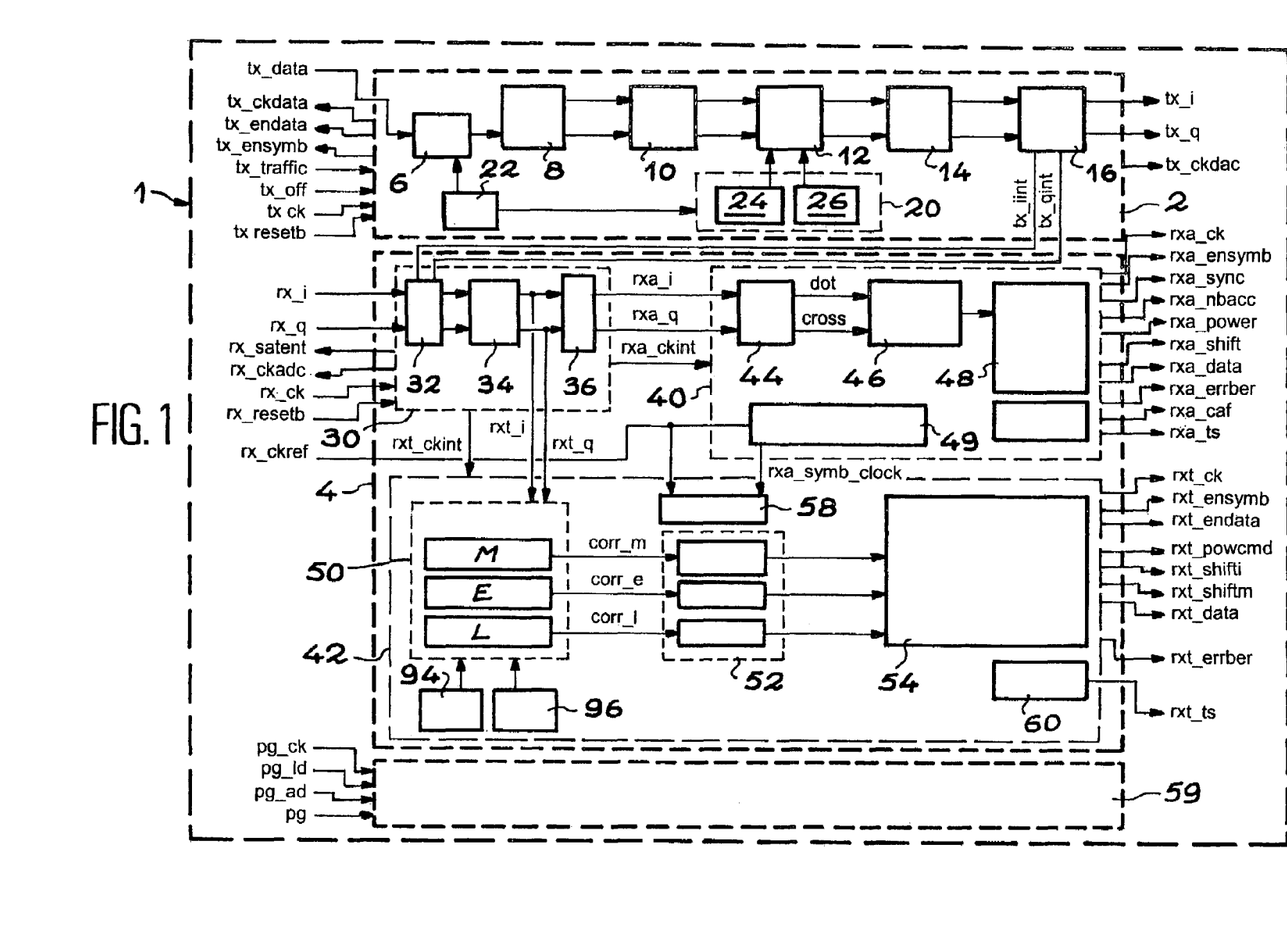
FIG. 1 shows a block diagram of the circuit according to the invention.

FIG. 1 shows a digital transmitting/receiving circuit 1, comprising a transmitter 2 capable of transmitting the binary symbols spread by the spreading codes and a receiver 4 capable of receiving binary symbols transmitted by a source.

The circuit 1 is intended to equip a plurality of sources in a CDMA system, such as for example modems, exchanging binary symbols with a concentrator. The concentrator likewise comprises a circuit 1 identical to that of the sources.

The modem which wishes to start a transmission transmits information modulated with a specific acquisition code which is the same for all the modems; the items of information arriving at the concentrator are demodulated in order to extract from them:

the number of transmitting sources,
the power of the principal source, that is, the source demanding the strongest power,
the shift of the transmitted symbols with respect to the reference symbol clock of the principal source, that is, the clock which provides a synchronizing signal for symbols transmitted by the principal course. This shift information is transmitted via the downlink to the transmitting modem in order for this to adjust its symbol reference to the reference provided by the symbol clock of the principal source.

The transmitter 2 comprises a data entry block 6, mounted in cascade with a data parallelization block 8, a differential modulation block 10, a spreading block 12, a summation block 14, and a first pulse filter 16.

A first module 20 provides to the spreading block 12, binary codes for performing the spreading of symbols to be transmitted, and a second module 22 generates an internal clock signal. The first module 20 comprises a table 24 comprising a plurality of codes and a code allocation mask 26 which permits selecting the codes used in the transmitter 2. The binary rate of the transmitter 2 is directly connected to the number of validated codes in the mask 26.

The receiver 4 comprises an input stage 30, an acquisition control stage 40, and a traffic control stage 42. The input stage 30 comprises a received signal shaping block 32, a pulse filter 34 intended to limit the spectrum of the received signals, and a filtered signal sampling stage 36. The input stage 30 transmits, on the one hand, the previously processed baseband data (rxa_i, rxa_q) to the acquisition control stage 40 which extracts from them the power and time shift information of the received symbols with respect to the base clock of the receiver 4, and on the other hand the data (rxt_i, rxt_q) at the traffic control stage 42 which extracts from them the transmitted binary data and the power and time shift information of the received signals with respect to the base clock (rx_ckref) of the receiver 4.

The acquisition control stage 40 comprises a first differential modulation module 44, an acquisition signal generating module 46, and a module 48 for processing the generated signal. The module 48 permits detecting the access of new sources to the transmission channel and generates synchronization signals and power control signals corresponding to each new source detected. A first clock control block permits generating a local symbol clock (rxa_symb_clock) and calculating the time shift of the received symbols with respect to a receiver reference clock (rx_ckref).

The traffic control stage 42 comprises a correlation stage 50 comprising a first path M, a second path E, and a third path L. The paths M, E, L respectively transmit correlated data corr_m, corr_e and corr_l to a second differential demodulation stage 52 which transmits the demodulated data to a calculation stage 54 intended to determine the synchronization signals and the power control signals corresponding to each transmission source. A second clock control block 58 permits piloting the whole of the traffic control stage 42, either directly by the reference symbol clock (rx_ckref), in the case of a synchronous CDMA application; or by the local symbol clock (rxa_symb_clock) of the acquisition control block (40) in the case of a point-to-point application (asynchronous link).

A programming module 59, accessible via a simple interface comprising an address bus and a data bus, permits programming the different operators of the circuit as a function of the desired use.

Four modulation formats may be used during transmission: BPSK (Binary Phase Shift Keying), DBPSK (Differential Binary Phase Shift Keying), QPSK (Quaternary Phase Shift Keying), or DQPSK (Differential Quaternary Phase Shift Keying). BPSK and QPSK modulations are accessible by programming. In QPSK, two useful bits per symbol and per code are transmitted, necessitating regrouping the entering data by packets of two bits "I" and "Q". In BPSK, a single useful bit is transmitted per symbol and per code. The entering data are copied onto I and Q, then in the rest of the transmission chain, everything is the same as for QPSK modulation.

The base PSK modulation may be transformed into DPSK modulation by a process of differential encoding by simple programming. The binary data, grouped in two-bit symbols, are differentially coded according to the IEEE 802.11 and DVB standards.

Figure 2:
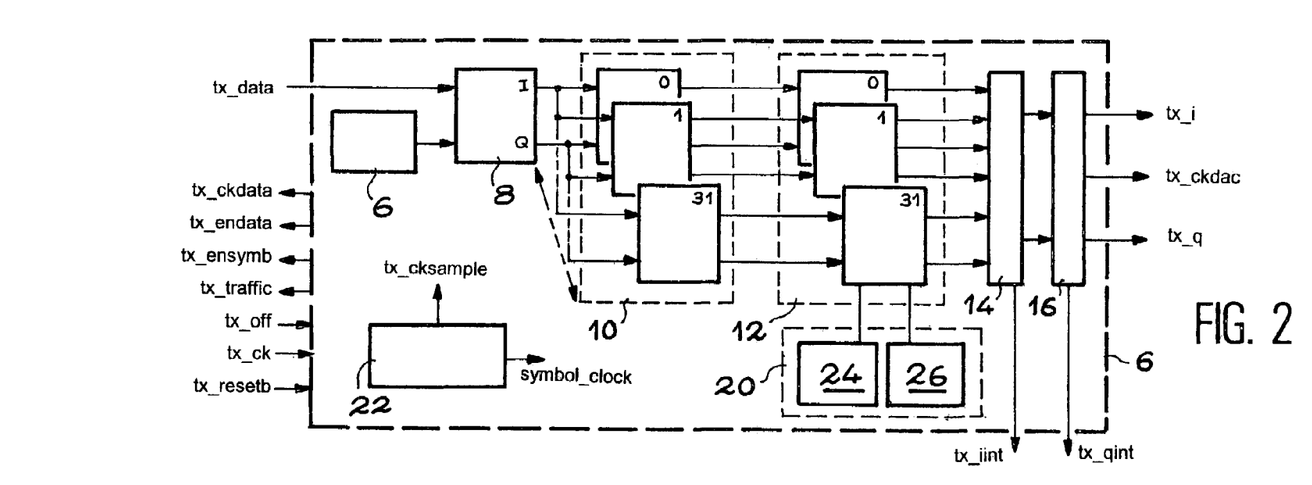
FIG. 2 shows a detailed block diagram of a transmitter integrated into the circuit of FIG. 1.

FIG. 2 shows a detailed diagram of the transmitter 2.
The inputs and outputs relating to the transmitter are:
With the exterior:
tx_ck: base clock of the transmitter 2;
tx_resetb: initialization command;
tx_off: command for interruption of transmission;
tx_traffic: command for traffic or acquisition mode;
tx_data: input of binary data;
tx_ensymb: symbol validation command;
tx_endata: data validation command;
tx_ckdac: sample clock for analog-digital converters;
tx_i: transmitter output path I, tx_q: transmitter output path Q.

With the receiver input stage:

tx_iint: internal looping of the transmitter output path I;

tx_qint: internal looping of the transmitter output path Q;

The transmitter 2 is made operational by the programming of the spreading codes (TX codes), of the code selection mask (TX code mask), and of the symbol clock setting instruction (TX clock shift).

The transmitter 2, thus programmed, is ready to process three sources of binary data corresponding to three different operating modes:

- a mode termed EXTERNAL in which a serial bit stream from the exterior enters via the tx_data port. The data are presented to the circuit through a buffer having a rate compatible with the binary rate of the transmitter 2. The latter acts on the buffer by means of the validation signal tx_endata and of a data sampling clock signal tx_ckdata. The tx_ensymb signal marks with the code 0 the data which will be spread,
- a mode termed INTERNAL, in which a $2^{9-1}$ pseudo-random pattern is internally generated from a shift register, for various purposes, for example self-test of the component,
- a mode termed ACQUISITION, in which a pattern composed of zeros leads to modulating symbols always equal to (0, 0) and thus to the transmission of unmodulated codes. In this case, the differential coder is forced to "0".

In operation, the transmitter 2 receives a clock signal tx_ck, which can have a frequency which is a multiple of the sample frequency.

The signal tx_resetb activates the operation of the whole of the transmitter 2. When tx_resetb=0, no clock signal is distributed, and the transmitter is not operational. When tx_resetb goes to "1", the transmitter 2 becomes operational and is initialized.

The sampling clock signal tx_cksample is generated inside the circuit by the module 22. This signal is transmitted to the exterior of the circuit via the terminal tx_ckdac, for possible piloting of digital-analog converters situated upstream of the RF portion of the transmitter 2.

The module 22 likewise generates a symbol clock symbol_clock from programming words defining the symbol length.

This symbol clock may be adjusted by means of specific programming.

This setting command has as its purpose to synchronize the codes in the region of the receiver 4. The accuracy of resetting the clock is ¹/₁₆th of a pulse.

The circuit should remain operational during the phase of changing the instruction: tx_resetb=1.

Whatever the mode of operation, TRAFFIC or ACQUISITION, setting does not cause the loss of a symbol, whether the symbol is lengthened (negative instruction) or shortened (positive instruction).

A 32-bit register contains the mask: mask_tx (31; 0). If the bit mask mask_tx(i)=1, then the code i is valid; if not, the code i is not used.

The mask is used:

for generating the validation signal tx_endata, which will cause the binary data buffer to transmit, to validate the corresponding spreading output paths.

When the mask is modified, the new instruction is taken into account immediately at the level of spreading. On the contrary, the next tx_ensymb is awaited to modify the validation signal tx_endata.

The thirty-two codes available in the transmitter 2 are stored in a RAM memory. Spreading is effected for each code, the same code being used for the paths I and Q. Spreading, for a given code, consists of multiplying the items of information I and Q at the differential coding output by different code coefficients so as to pass from a symbol frequency signal to a pulse frequency signal (or "chip").

The spread signal, for a given code, takes the value +1 or −1 during a single sample for each pulse and the null value for the other samples. As a function of the mask, the spread items of information are then summed, then passed to the pulse filter 16.

So as to limit the spectrum of the transmitted signal and to limit interference between pulses, a low-pass transmission filter is used which gives a particular shape to the pulse.

This pulse can be:

- a rectangular pulse; in this case, the filter has an spc (sample per chip) length of the number of samples per pulse, all the coefficients being equal to 1.
- a pulse corresponding to a square-root raised cosine transfer function (SRRC) with a damping coefficient equal to 0.4.

Figure 3:
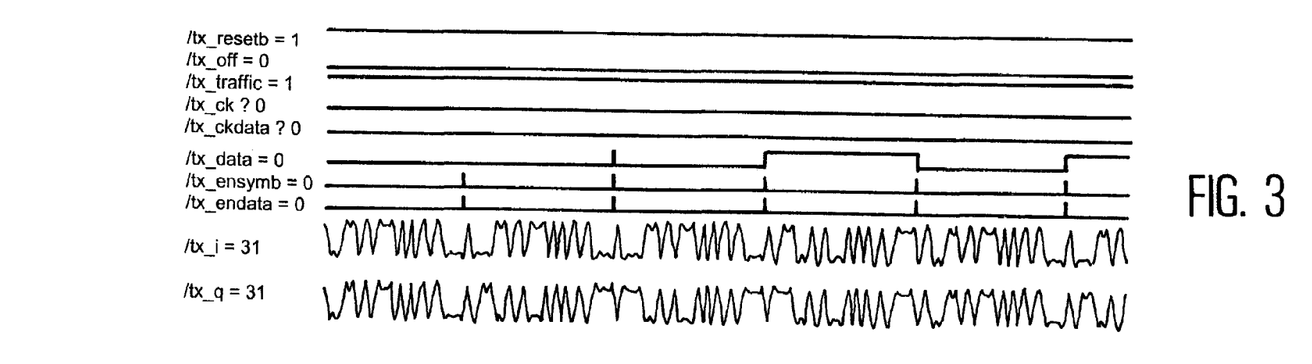
FIGS. 3 and 4 shows signals illustrating the operation of the transmitter according to the invention respectively in acquisition mode and traffic mode.
Figure 4:
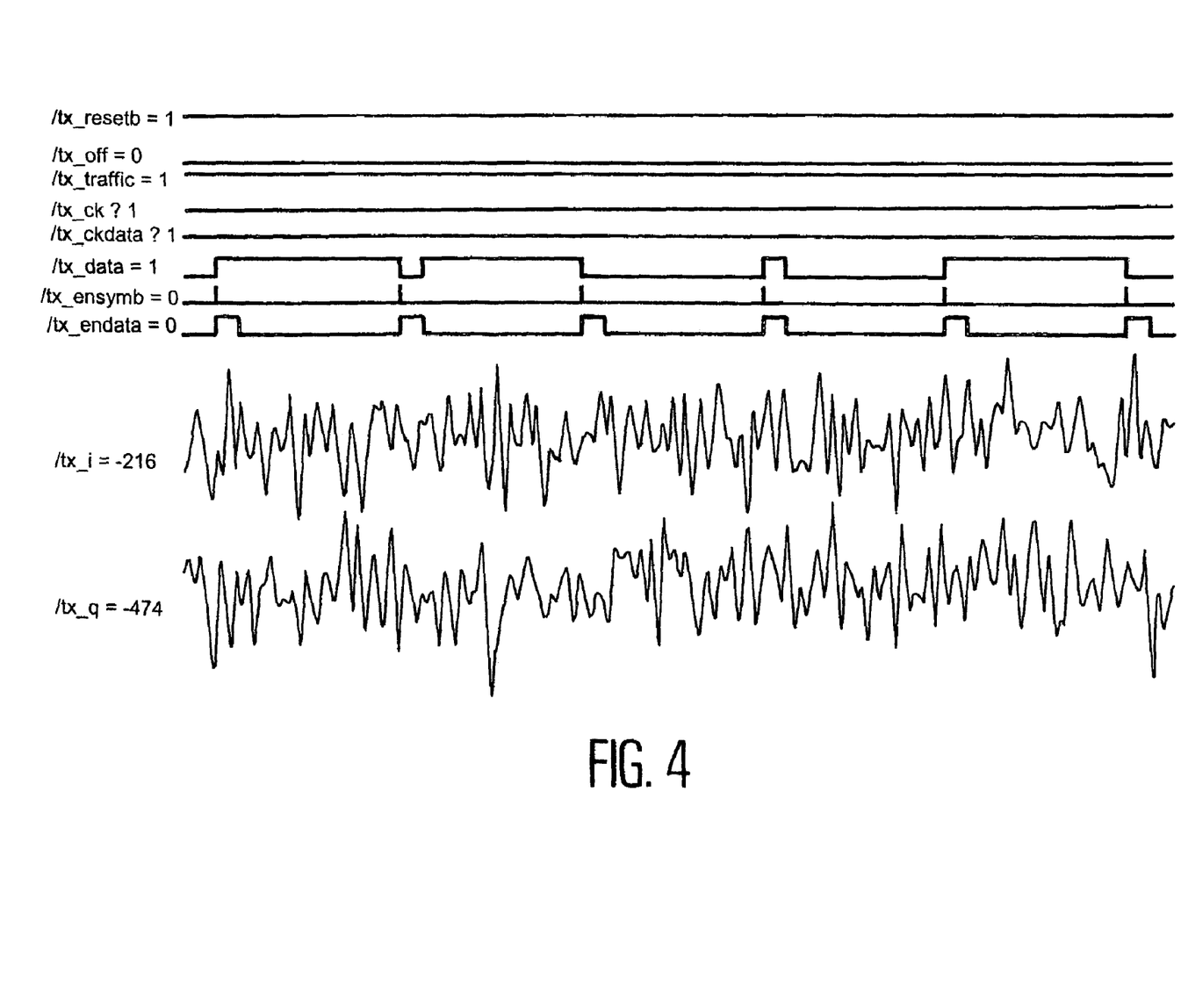

As has been stated previously, the transmitter 2 enables the two essential phases of a synchronous CDMA transmission to be controlled, the acquisition phase and the traffic phase. The selection of one of these two phases is made by means of the external command tx_traffic.

In the ACQUISITION mode (tx_traffic=0):

a single code is allocated to the transmitter 2, by means of the mask (a priori, the code 0), null symbols are generated internally at the level of control of entering data; the ACQUISITION mode is used. The transmitter 2 implements spreading and pulse filtering.

In the TRAFFIC mode (rtx_traffic=1):

a certain number of codes are allocated to the transmitter 2 by means of the mask, the transmitter 2 controls taking into account of the binary data (the entering data are acquired according to the EXTERNAL mode), performs modulation and spreading on the different codes, sums the spread items of information and applies the pulse filter.

The transmission can be interrupted by an external command, tx_off.

When tx_off=1, the transmitter 2 stops the transmission, and when tx_off=0, the transmitter 2 resumes transmission.

In the traffic phase, the rate of a source can be adapted by modifying the number of codes assigned to it.

Two procedures can be envisaged for modifying the mask:

with interruption of the transmission: the new mask being loaded during this interruption, without interruption of the transmission: the new mask is loaded during transmission.

Figure 5:
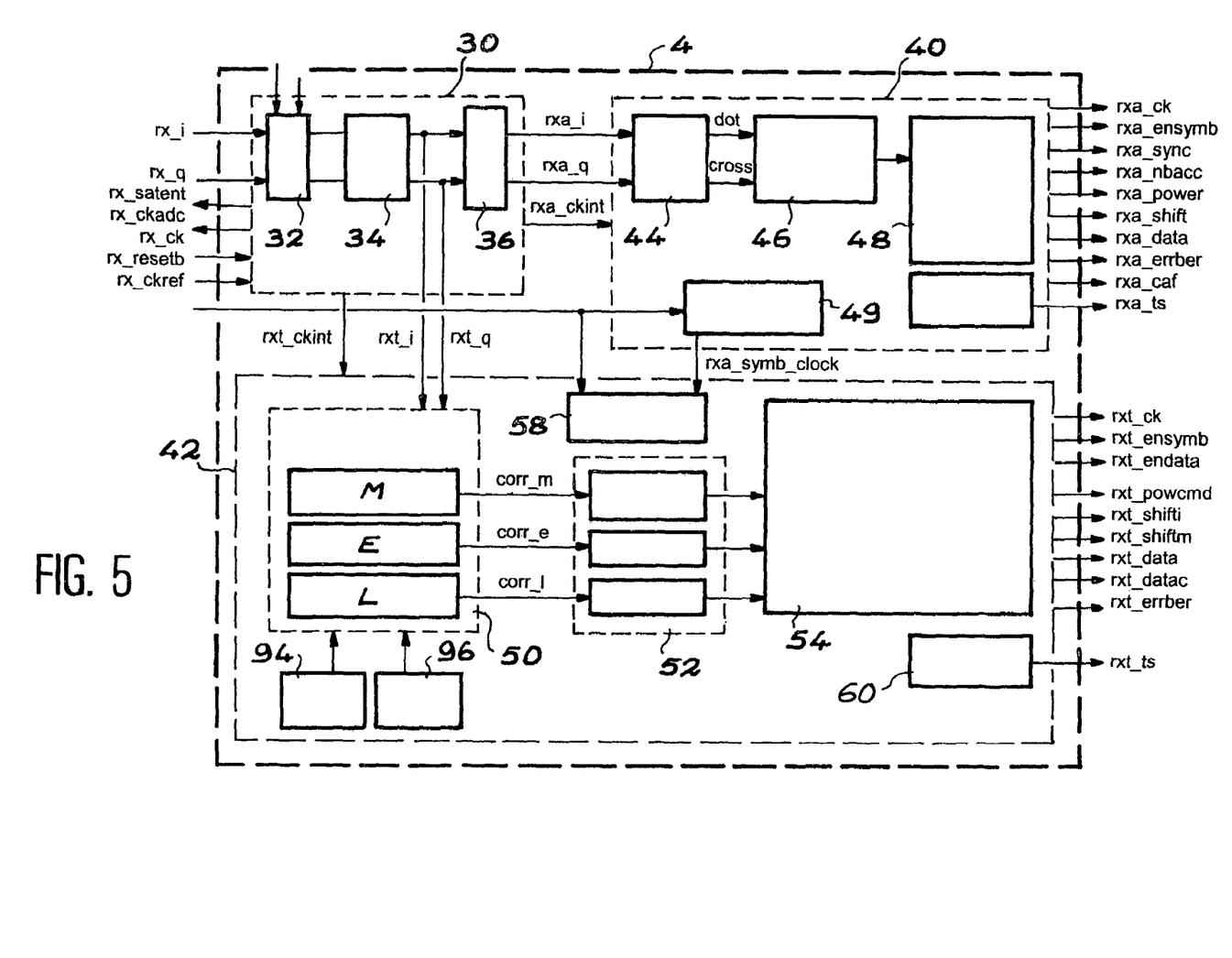
FIG. 5 shows a detailed block diagram of a receiver incorporated into the circuit of FIG. 1.

FIG. 5 shows a diagram of the receiver 4 comprising the input stage 30, the acquisition control stage 40, and the traffic control stage 42.

As has been said previously, the input stage 30 performs the shaping of the baseband signals and transmits them to the acquisition stage 40 and to the traffic stage 42.

The basic functions of the input stage 30 are:

control of the clocks;

generation of clocks for the acquisition control stage 40 and the traffic control stage 42;

shaping the baseband signals;

pulse filtering;

sampling the filtered signals and transferring processed signals and clock signals to the acquisition control 40 stage and traffic control stage 42.

Figure 6:
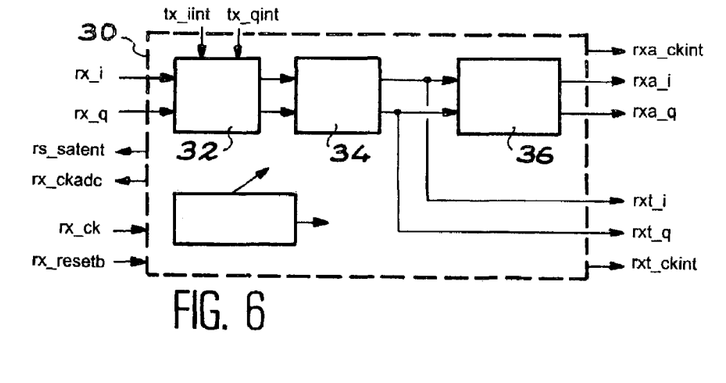
FIG. 6 shows a block diagram of an input stage incorporated into the circuit of FIG. 5.

FIG. 6 illustrates the internal architecture of the input stage 30.

The inputs and outputs relating to this stage are:
with the exterior
rx_ck: base clock of the receiver 4,
rx_resetb: reset to zero for initialization,
rx_i: input of receiver 4 path I,
rx_q: input of receiver 4 path Q,
rx_ckadc: sample clock for analog-digital converters,
rx_satent: saturation in shaping of input data.
With the transmitter 2:
tx_iint: internal looping of the output of the transmitter 2, path I,
tx_qint: internal looping of the output of the transmitter 2, path Q.
With the acquisition stage 40,
rxa_ckint: base clock of the acquisition stage 40,
rxa_i: baseband information of path I.
rxa_q: baseband information of path Q.
With the traffic control stage 42,
rxt_ckint: base clock of the traffic control stage 42,
rxt_i: baseband information of path I.
rxt_tq: baseband information of path Q.

In operation, the receiver 4 receives the clock rx_ck, which is a clock at the sampling frequency. The signal rx_resetb activates the operation of the whole of the receiver 4. When rx_resetb=0, no clock signal is distributed, and the receiver 4 is not operational. When rx_resetb goes to "1", the receiver 4 becomes operational and is initialized.

The sample clock rx_ck is transmitted outside the circuit 1 via the terminal rx_ckadc for possible piloting of analog/digital converters situated downstream of the RF portion of the receiver 4.

The I and Q baseband information is presented in parallel to the receiver 4 on ports rx_i and rx_q.

A shift is added to the input data.

A second pulse filter 34, identical to that of the transmitter 2, is incorporated into the receiver 4. The "chip" pulse may be:
  a rectangular pulse; in this case, the filter length is spc (number of samples per pulse) and all the coefficients are equal to 1.
  a pulse corresponding to a square-root raised cosine (SRRC) transfer function with a damping coefficient equal to 0.4.

The sample clock rx_ck of the input stage 30 is passed to the traffic control stage 42 of the receiver 4 (rxt_ckint), and to the acquisition stage 40 of the receiver 4 (rxa_ckint).

At the output of the input stage 30, two distinct streams of data (rxa_i, rxa_q) and (rxt_i, rxt_q) are respectively transmitted to the acquisition control stage 40 and to the traffic control stage 42 as well as two clocks rxa_ckint and rxt_ckint.

Figure 7:
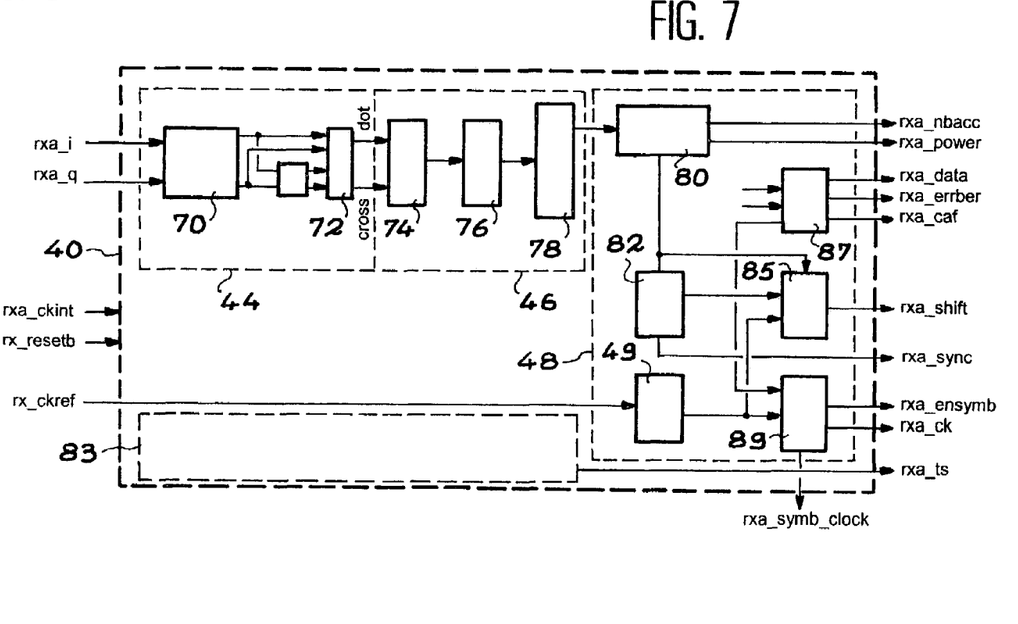
FIG. 7 shows a block diagram of an acquisition control stage incorporated into the circuit of FIG. 5.

FIG. 7 illustrates in detail the internal architecture of the acquisition stage 40 of the receiver 4. This stage receives the baseband information preprocessed at the input stage 30 and makes use of it to extract power and clock shift information, respectively, from it by means of the calculation module 48 and of the first clock control module 49.

The basic functions of the acquisition stage 40 are:
differential demodulation
correlation of baseband information with the acquisition sequence,
differential multiplication,
generation of the acquisition signal (or channel estimation),
signal selection,
low-pass filter,
thresholding,
processing the acquisition signal,
detection of correlation peaks (number of sources),
power estimation,
control of symbol clocks,
evaluation of the clock shift command,
determination of received binary data,
output of clocks and data,
display of internal signals.

The inputs and outputs relating to the acquisition stage 40 are:
With the exterior:
rx_resetb: reset to zero for initialization
rx_ckref: reference symbol clock,
rxa_ck: acquisition path clock,
rxa_ensymb: symbol enable,
rxa_data: binary data,
rxa_power: power
rxa_nbacc: number of peaks detected,
rxa-shift: symbol clock shift information,
rxa_sync: indication of synchronization with respect to local symbol clock,
rxa_caf: automatic frequency control information,
rxa_errber: data generator error indication,
rxa_ts: output port for signal observability.
With the input stage 30 of the receiver 4:
rxa_ckint: base clock of acquisition stage 40,
rxa_i: acquisition stage input path I,
rxa_q: acquisition stage input path Q.
With the traffic stage of the receiver 4,
rxa_symb_clock: local symbol clock for asynchronous linking.

When the acquisition stage 40 is made operational by the programming of an acquisition sequence (Rx acquisition code), a matched filter 70 integrated into the differential demodulation module 44 performs the correlation between the baseband information after shaping, rxa_i and rxa_q, and the acquisition sequence. The maximum length of the correlation sequence is 128 pulses. The matched filter is formed by 256 shift registers, enabling all the samples of a symbol to be permanently stored. These registers are grouped in twos. A coefficient of the sequence is applied at the outputs of these pairs of registers to produce a multiplication by 0, +1 or −1.

A differential multiplication block 72 integrated into the demodulation module 44 calculates the dot and cross signals from the outputs of matched filters, dot being the real portion of the result of the complex multiplication of the output of the matched filter and this same output delayed by the duration of a symbol, cross being the imaginary portion.

The following equations illustrate the calculation performed, with I(n) and Q(n) corresponding to the outputs of the matched filter and I(n−1) and Q(n−1) to the delayed outputs:

$$\text{dot} = I(n)I(n-1) + Q(n)Q(n-1)$$

$$\text{cross} = I(n-1)Q(n) - I(n)Q(n-1)$$

Figure 8:
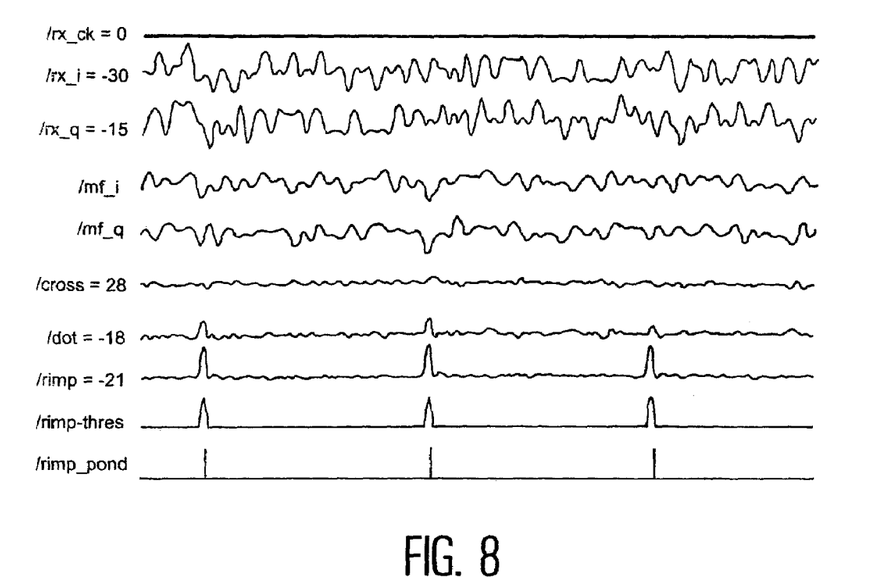
FIG. 8 illustrates the signals processed in the acquisition control stage of FIG. 7.

FIG. 8 illustrates the signals processed in the acquisition stage 40, particularly the correlation outputs mf_i and mf_q and the results of the differential demodulation: dot and cross.

Figure 9:
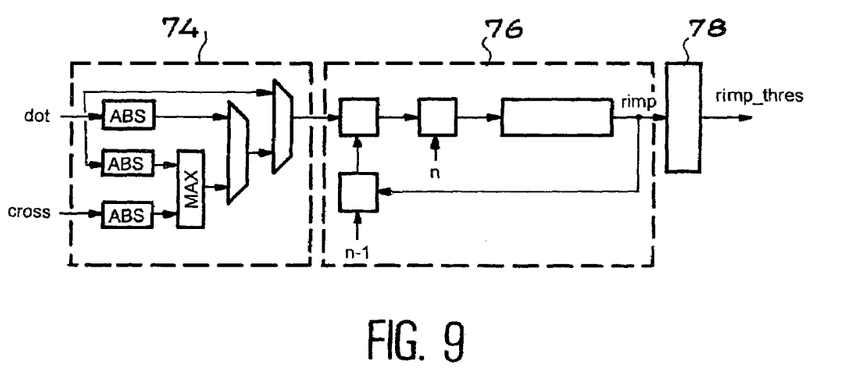
FIG. 9 shows the internal architecture of a selection block and a filtering block incorporated into the acquisition control stage of FIG. 7.

FIG. 9 illustrates the internal architecture of the selection block 74 and of the filtering block 76. The acquisition signal corresponds to the estimate of the pulse response of the transmission channel (see patent application Ser. No. 96.15569 filed by the Applicant: "Method of information transmission by pulse response and corresponding receiver". Programming permits choosing as useful signal for acquisition one of the following signals:
  dot: unmodulated code, corresponding for the transmitter 2 to the ACQUISITION mode of operation with internal generation of null symbols; the correlation peaks are on the dot signal and are positive, abs(dot): code modulated in DBPSK, permitting transmission of data on the acquisition code with a better signal-to-noise ratio than in the DQPSK case, MAX (abs(dot), abs(cross)): code modulated in DQPSK, conventional case used when the code is modulated.

Whatever signal is chosen, its value at the level of a peak is representative of the received power for the corresponding access, but is noisy.

The previously selected signal is strongly affected by multiple access noise when the load is high. The low-pass filter 76 permits performing a filtering of this signal so as to increase the detection probability of access peaks and to improve the estimation of the received power for this access.

A recursive low-pass filter of programmable depth (up to 512 symbols, value defined by programming) is used to reduce the noise. The output of the filter 76 gives an estimate of the non-thresholded pulse response of the transmission channel; this signal is named rimp.

The rimp signal coming from the low-pass filter 76 is then thresholded in the block 78 by means of a program word. The thresholded signal rimp_thres is then defined by:

if rimp≧acquisition threshold, then rimp_thres=rimp, if not, rimp_thres=0.

The signal rimp_thres is analyzed in each symbol window in order to determine:

the number of peaks present, the position and amplitude of the principal peak.

Beforehand, the signal rimp_thres is processed so as to preserve only the maximum values of the peaks represented by a new signal rimp_pond; by means of this new signal rimp_pond, the number of peaks exceeding the acquisition threshold may easily be counted, and defines the number of transmitters in acquisition phase or the access number. This information coded on two bits is transmitted by the circuit 1, in serial form, via the port rxa_nbacc to each symbol (LSB then MSB).

The following table illustrates the coding of the access number.

| coded information | number of accesses detected |
| --- | --- |
| 00 | 0 |
| 01 | 1 |
| 10 | 2 |
| 11 | more than 2 |

A search mechanism for the maximum of the signal rimp_thres permits defining the position of the principal peak in the symbol window: mean_peak_position. This information is then transmitted to the first clock control module 49 to permit resetting it.

The amplitude of the principal peak (rimp max), in the symbol window, is internally stored and is emitted from the circuit 1 for each symbol in serial form via the port rxa_power.

A counter incorporated in the first clock control module 49 is incremented for each sample and constitutes the basis for generating the local symbol clock 82 (FIG. 7). Denoting by N the number of pulses per symbol and by spc the number of samples per pulse, in a stable phase, that is, when the principal peak always appears at the same position in the symbol window, counting is performed from "0" to "N*spc−1", and the local clock edge is generated when the counter passes the value "(N*spc−1)/2".

During the dynamic phase corresponding to the appearance, disappearance and slipping of the principal peak, the counter can be loaded with an initial value different from "0", permitting resetting the local symbol clock.

The mechanism of searching for the maximum on the rimp_thres signal during a symbol window permits defining the position of the principal peak in the symbol window, mean_peak_position, delivered at the output of a peak detection block 80 (FIG. 7) incorporated in the acquisition module 48. The position corresponds to the clock shift value in number of samples. From this information, calculated for each symbol, two methods may be used for resetting the local symbol clock counter 82 (FIG. 9), that is, for defining the initial value:

rapid locking: the initial value is equal to the shift value, the clock is then reset by 1 symbol, slow locking: the initial value is equal to the sign of the shift value: +1 or −1 or 0, the shift value defining the number of symbols necessary to perform resetting of the clock.

An indication of synchronization of the local symbol clock 82 is transmitted by the circuit 1 via the port rxa_sync. When rxa_sync=1, the local symbol clock is set, and the principal peak always appears at the same position in the symbol window. When rxa_sync=0, the resetting of the local symbol clock 82 is active.

The local symbol clock block 82 (FIG. 7) receives a reference clock signal rx_ckref. The rising edges of this clock should be spaced apart exactly by one symbol period. This signal is internally treated as a datum in the circuit, the rising edge is detected in order to initialize a counter serving as basis for the internal control of the reference symbol clock reference_symbol_clock, for the acquisition stage 40. This internal clock is used to calculate the clock shift instruction 85 and possibly for synchronizing the information coming from the acquisition stage 40.

Two possibilities may be envisaged for calculating the symbol clock shift instruction:

either from the position of the principal peak in the symbol window (main_peak_position); in this case, whatever the locking mode of the local clock signal, the clock shift information is correct and is produced immediately;

or from the local symbol clock (local_symbol_clock) 82, in the case of the rapid locking mode of the local symbol clock; the clock shift information is correct, and a symbol appears after the appearance of the new peak and, in the case of the slow mode, the clock shift information is incorrect during the X local clock reset symbols.

The clock shift information produced is directly compatible with the transmitter 2, the low weight bit defining 1/16th of a pulse. The calculation of this information of shift made in the acquisition stage 40 or 48 is precise to 1/8th of a pulse: the low weight bit of the instruction is always null, evidently so when eight samples are processed per pulse. The shift information is transmitted by the circuit 1 in serial form via the port rxa_shift.

The determination of binary data is performed by means of the local symbol clock 82 (local_symbol_clock), which defines the instant of capture of the dot and cross information.

In DBPSK modulation, the correlation peaks appear uniquely on the dot signal; the sign of the peak corresponds to the binary information. In DQPSK modulation, the peaks are present alternately on the dot signal and the cross signal; the sign of the peak and the signal on which they occur permit the two bits of information to be decoded. The following table illustrates the decoding of data:

| max absolute value | sign of peak | symbol decoded (I, Q) | phase jump |
|---|---|---|---|
| dot | + | 00 | 0 |
| cross | − | 10 | −90° |
| dot | − | 11 | 180° |
| cross | + | 01 | +90° |

These two bits of information are transmitted from the circuit 1 in serial form via the port rxa_data, the first corresponding to the bit I and the second to the bit Q.

The acquisition stage 40 incorporates a self-test mechanism based on a $2^9-1$ random data generator identical to that of the transmitter 2. It permits verifying that the data generated by the transmitter 2 are correctly decoded in the acquisition stage 40; rxa_errber is then=0.

For this, the transmitter 2 should be in the TRAFFIC mode and use only the acquisition code. The looping of the transmitter 2 to the receiver 4 can be performed externally at the level of the circuit 1, or internally.

Starting from the values of dot and cross, an automatic frequency control command CAF is generated at the position of the peak of greatest amplitude defined by the local clock 82. This information characterizes the frequency shift of the clock of the receiver 4 with respect to that of the transmitter 2; the CAF bit, calculated at each symbol and transmitted via the port rxa_caf, gives the direction of this shift.

A frequency shift induces the appearance of a parasitic peak on the path not containing the correlation peak (cross in DBPSK, dot or cross in DQPSK).

In DBPSK, the module 48 of stage 40 calculates the CAF bit by the function XOR(sign(dot), sign(cross)) at the position of the principal peak.

In DQPSK, if the correlation peak is present on the dot path, the CAF bit=XOR(sign(dot), sign(cross)); if not, (peak on cross), the CAF bit=NOT(XOR(sign(dot), sign(cross))).

The internal clock rxa_ckint is transmitted from the circuit 1 via the port rxa_ck.

The reference symbol clock (reference_symbol_clock) is transmitted to the exterior in the form of a validation signal rxa_ensymb, of duration one internal clock period of the acquisition stage (rxa_ckint). This validation signal permits marking the low weight bit of all the output information in series rxa_power, rxa_shift, rxa_nbacc, rxa_data.

The local symbol clock 82 (local_symbol_clock) is likewise transmitted from the acquisition stage 40 to the traffic control stage 42 (rxa_symb_clock), to permit utilization of this circuit in the context of an asynchronous link. In the case of an asynchronous link, the local symbol clock of the acquisition stage 40 directly pilots the traffic control stage 42. The definition of the type of link, synchronous or asynchronous, is made by programming.

Internal signals (mf_i, mf_q, dot, cross, rimp, rimp_pond) may be transmitted via the port rxa_ts in order to be displayed on an oscilloscope.

Figure 10:
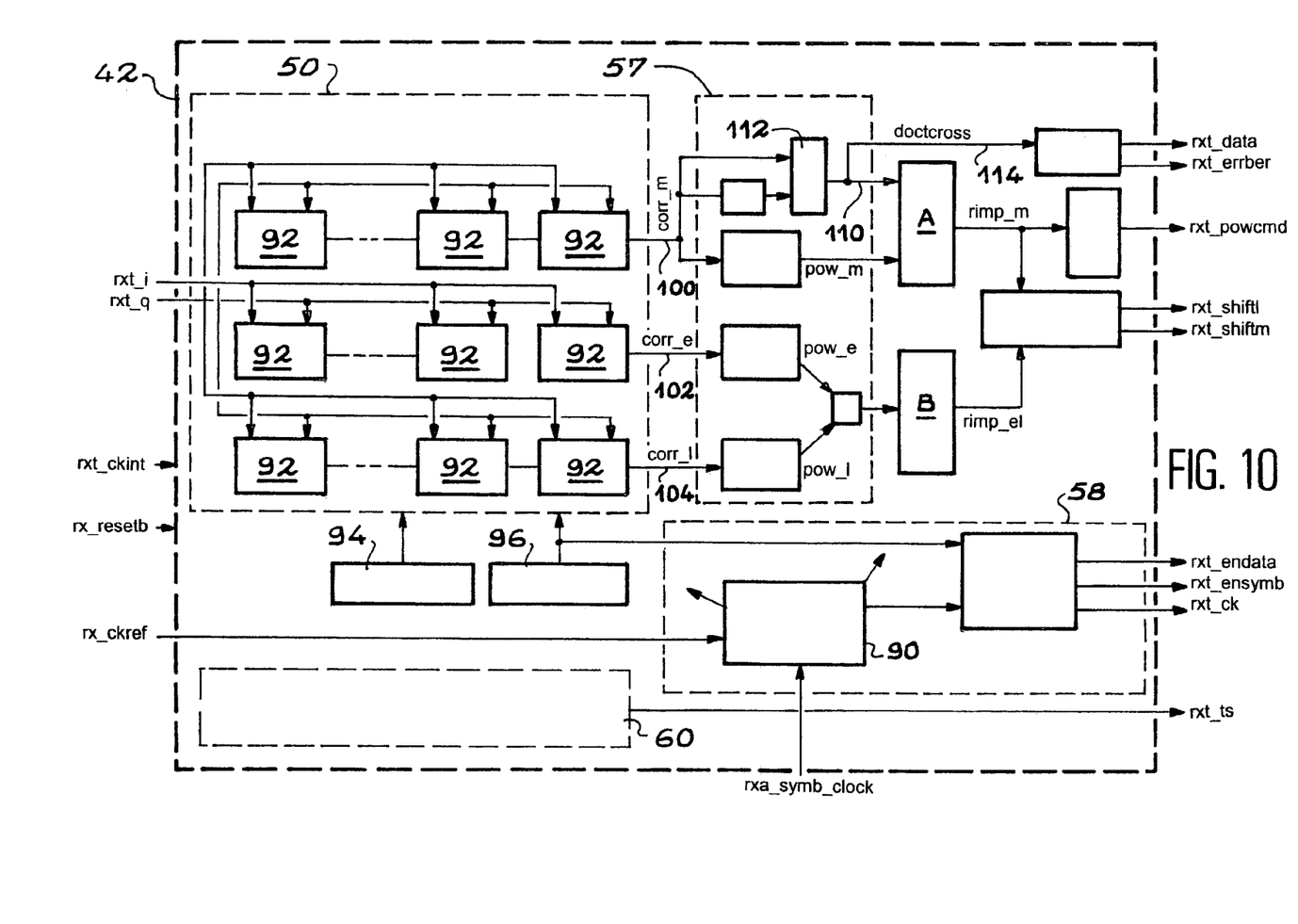
FIG. 10 shows a detailed block diagram of the traffic control stage of FIG. 5.

FIG. 10 illustrates the internal architecture of the traffic control stage 42.

The basic functions of this stage are:
- the control of the clocks,
- the correlation of baseband information by traffic sequences,
- the post-treatment of correlation outputs,
- differential multiplication,
- the determination of the received binary data,
- the estimation of power,
- the evaluation of the clock shift command,
- the output of clocks and data,
- the display of internal signals.

The inputs and outputs relating to the traffic control stage 42 are:

With the exterior:
- rx_resetb: reset to zero for initialization;
- rx_ckref: reference symbol clock,
- rxt_ck: traffic path clock,
- rxt_ensymb: validation of symbols,
- rxt_endata: validation of data,
- rxt_data: binary data,
- rxt_powcmd: power control,
- rxt_shiftm: symbol clock shift information (high weight)
- rxt_shiftl: symbol clock shift information (low weight),
- rxt_errber: data generator error indication
- rxt_ts: output port for observability of symbols.

With the input stage 30:
- rxt_ckint: base clock of traffic control stage 42,
- rxt_i: input of traffic stage, path I,
- rxt_q: input of traffic stage, path q.

With the acquisition stage 40:
- rxa_symb_clock: local symbol clock for asynchronous link.

To make the traffic control stage 42 operational, it is necessary to program traffic sequences (Rx traffic codes) and the code selection mask (Rx code mask).

In operation, the traffic control stage 42 receives a reference symbol clock rx_ckref. This clock is used in the acquisition control stage 40 and traffic control stage 42 of the receiver 4.

The rising edges of this clock should be spaced apart by exactly one symbol period.

This signal is treated as a datum internally of the circuit; the rising edge is detected in order to initialize a counter serving as the internal basis of the internal control of a second reference symbol clock 90 (reference_symbol_clock) incorporated in the second clock control module 58.

This internal clock 90 is used to pilot the set of processes of the traffic control stage 42 and particularly the correlators 92.

If the circuit is used in the context of an asynchronous link, the traffic control stage 42 is directly piloted by the local symbol clock of the acquisition stage 40 rxa_symb_clock, that is, local_symbol_clock=rxa_symbol_clock.

In the embodiment illustrated by FIG. 10, a bank of thirty-two sliding correlators 92 performs the correlations between the baseband information after shaping rxt_i and rxt_q and the traffic sequences provided by a code table 94 and a masking module 96. The maximum length of the correlation sequences is 128 pulses.

The correlators 92 are piloted by means of the second local symbol clock 90 (local_symbol_clock). They are set to the maximum value of the correlation peak and are used for the determination of binary data and the extraction of power.

The circuit processes two, four, or eight samples per pulse. In the whole stage of traffic control 42, a single sample per pulse is taken into account; this is why the I and Q information is serialized so as to reduce the material necessary for processing.

This serialization is performed by means of a signal i_qbar which oscillates at a frequency two times lower than the sampling frequency. When i_qbar=1, the information is linked to the path I; if not, it corresponds to the path Q.

Starting from the second local symbol clock 90, a validation signal en_symb_middle is generated, of duration two periods of the sampling clock. This signal marks the first sample (one item of information I and one item of information Q) of the symbol, and is used for:
- initializing the accumulator at each start of symbol,
- piloting the reading module 94 for code coefficients stored in RAM memory, and
- controlling the serialization of the outputs of the thirty-two correlators 92.

Another en_chip_middle signal identifies the pulse sample which is taken into account in the MIDDLE path.

The correlators are cascaded so as to produce a serial stream cor_m 100 from correlation values. This serial stream cor_m is applied to the input of the second differential demodulation stage 52; the sixty-four serialized values, starting from the start of the symbol, have the form: 0I, then 0Q, then 1I, then 1Q, then 2I, then 2Q, ending at 31Q.

Two other banks of thirty-two sliding correlators, of the same type as those of the path M, perform analogous processing, but are slightly phase shifted.

The phase shift between the paths E and L with respect to the path M may take two values: ¼ pulse or ½ pulse (the path E is advanced and the path L is delayed).

From the local symbol clock 90, and as a function of programming, two validation signals, of duration two sampling clock periods, are generated: en_early and en_late. These signals mark the first symbol samples which will be processed by the path E and the path L.

Two other signals, en_chip_early and en_chip_late, identify the pulse samples which are taken into account, respectively in the path E and in the path L. Two serial streams, respectively cor_e 102 and cor_l 104, are produced at the output of the two paths E and L and are applied to the input of the second differential modulation stage 52.

The code allocation mask 96 permits selecting the codes which it is desired to use in the traffic control stage 42; the binary rate is directly connected to the number of validated codes in the mask 96.

A thirty-two bit register contains the mask mask_rx(31:0). If the bit mask_rx(i)=1, then the code i is valid; if not, the code i is not used.

The mask is used:
- to generate the validation signal rxt_endata, which marks the codes used,
- to pilot the corresponding correlators.

When the mask is modified, the new instruction is immediately taken into account for the correlators. On the other hand, the next rxt_ensymb is awaited to modify the validation signal rxt_endata.

In the traffic phase, the rate of a source may be adapted by modifying the number of codes which are allocated to it.

Starting from path M correlation outputs (cor_m), differential demodulation is carried out, that is, the calculation of the dot and cross information, dot being the real portion of the result of the complex multiplication 112 of the correlation output with this same output delayed by the duration of a symbol, and cross the imaginary portion.

The following equations illustrate the calculation performed; I(n) and Q(n) correspond to the correlation outputs, and I(n−1) and Q(n−1) to the delayed outputs:

$$dot = I(n)I(n-1) + Q(n)Q(n-1)$$

$$cross = I(n-1)Q(n) - I(n)Q(n-1)$$

This dot and cross information, for each of the thirty-two codes, is calculated serially and defines the dotcross signal 114.

The determination of the binary data is performed from the dotcross signal 114.

In DBPSK modulation, the correlation peaks appear solely on the dot information, the sign of the peak corresponding to the binary information. In DQPSK modulation, the peaks are present alternately on the dot information and the cross information, the sign of the peak and the path on which it is located enabling the two bits of information to be decoded.

The choice of modulation type is made by programming. The data decoding table is illustrated by the following table:

| Max absolute value | Sign of the peak | Decoded symbol (I, Q) | Phase jump lump |
|---|---|---|---|
| dot | + | 00 | 0° |
| cross | − | 10 | −90° |
| dot | − | 11 | 180° |
| cross | + | 01 | 90° |

The processing of the thirty-two codes is performed serially. The sixty-four bits of calculated information are transmitted to the circuit 1 in serial form via the port rxt_data, the first pair corresponding to the information bits relating to code 0, the first being the bit I and the second the bit Q, the second pair to code 1, etc.

The traffic control stage 42 incorporates a self-test mechanism based on a $2^9-1$ random data generator identical to that of the transmitter 2. It permits verifying that the data generated by the transmitter 2 are correctly decoded in the traffic control stage 42; rxt_errber is then=0.

For this, the transmitter 2 has to be in traffic mode and synchronized with respect to the reference symbol clock, and the traffic control stage 42 has to have the same code mask. The looping of the transmitter 2 to the receiver 4 can be effected externally at the level of the circuit or internally.

The signal energy I2+Q2 is calculated from the correlation outputs 92 for the three paths M, E and L (cor_m, cor_e, cor_l).

This information, for each of the thirty-two codes, is calculated serially and defines the signal pow_m for the path M, pow_e for the path E, and pow_l for the path L. The information is stable for two sampling periods.

A low-pass filter on the path M permits improving the estimation of power by reducing noise.

Programming permits choosing as the signal used for power estimation one of the following signals:
- pow_m: energy on the path M,
- abs(dot): result of differential demodulation in DBPSK,
- MAX (abs(dot), abs(cross)): result of the differential demodulation in DQPSK.

The dot and cross items of information appear serially on the dotcross signal.

Figure 11:
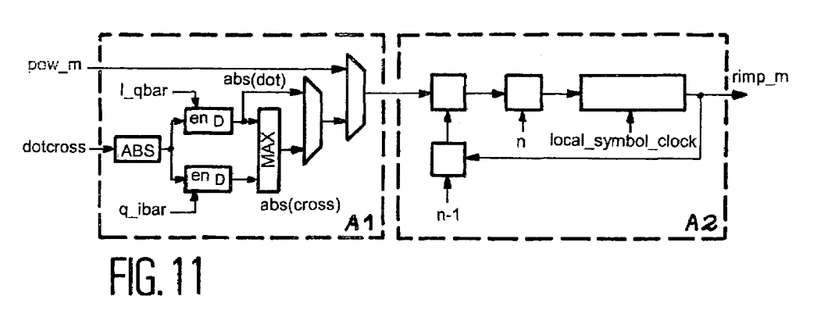
FIGS. 11 and 12 respectively show the internal architecture structure of a first and a second selection block, mounted in cascade respectively with a first and second filtering block with which the traffic control stage of FIG. 10 is equipped.

FIG. 11 shows the internal structure of the architecture of the selection block A1 and the filtering block A2 for the path M power signal. The filtering block A1 is a recursive type filter, and of depth programmable up to n=512 symbols. At the filter output, the signal rimp_m contains the thirty-two items of information relating to the thirty-two codes, each item of information being stable for two sampling periods.

Figure 12:
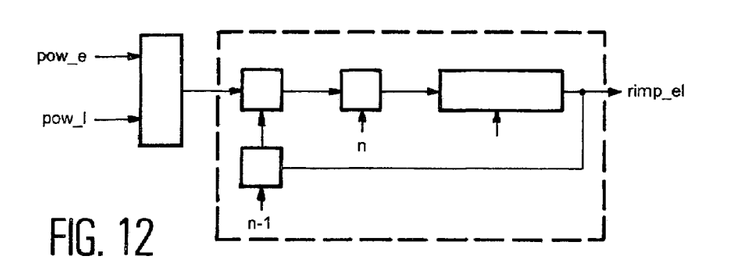

FIG. 12 shows the internal structure of the filtering block B for the path E and L power signals. This filter takes into account the difference between the energies of paths E and L and permits calculating an estimation of the separation of power between these two paths. This information is useful for the calculation of the clock shift.

The filtering block B is a low-pass filter identical to the filter present in the path M. The data processed by this filter are likewise signed, but the sign bit is not necessarily null. These data may be positive or negative.

The depth of the filter is identical to the depth of the path M filter. At the filter output, the signal rimp_el contains the thirty-two items of information relating to the thirty-two codes, each item of information being stable for two sampling periods. These items of information are signed.

The information rimp_m, coming from the low-pass filter A2 on the path M, corresponds to an estimate of the power for the thirty-two codes.

From this, a power command (powcmd) coded on two bits is calculated.

Figure 13:
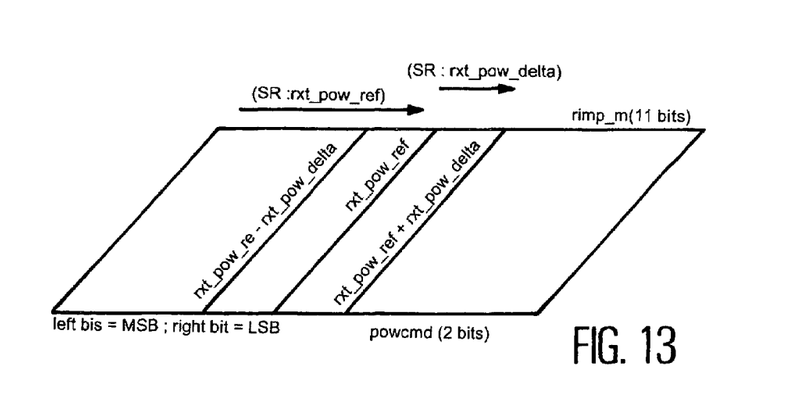
FIG. 13 illustrates the coding of the power control according to the invention.

FIG. 13 illustrates the coding of the power command.

The program word {SR: rxt_pow_ref} fixes the power reference, and the word {SR: rxt_pow—delta} defines a range around this reference.

The powcmd command is transmitted from the circuit for each symbol and for each code in serial form via the port rxt_powcmd (LSB then MSB).

Starting from the estimate of power (rimp_m) on the path M, and from the estimate of the separation of power (rimp_el) between the paths E and L, a symbol clock shift instruction is calculated.

This clock shift information: shift (3:0) constitutes a signed 4-bit word (value comprised in the interval [−7:+7], the low weight bit defining 1/16th of a pulse.

In contrast to the acquisition stage 40, where the calculation performed gives an instruction accurate to 1/8th of a pulse (the low weight bit is always null), in the traffic control stage 42, the instruction is accurate to 1/16th of a pulse.

The principle of the calculation of the symbol clock shift instruction rests on the conversion of a power separation into a time separation. The function connecting these two quantities is quasi-linear around zero and may be written:

$$\text{Shift} = \frac{Gr}{Gc} * \frac{\text{rimp\_el}}{\text{rimp\_m}}$$

Gr corresponds to the gain of resolution which permits the LSB of the command to be defined. The resolution of the tracking command is fixed at 1/16th of a pulse; consequently the value of Gr is 16.

Gc corresponds to the conversion gain, which is the slope of the conversion of time into power separation and depends on the shape of the correlation peak, and consequently of the pulse filter, and on the shift of the paths E and L.

The following table gives the approximate values of the parameter Gc, as well as the coding of the corresponding program word {SR: rxt_div_coef}.

| Pulse filter | E-L-Δ | Gc | {SR: rxt_dic_coef}. |
|---|---|---|---|
| RECT | 1/4 chip | 3 | 0 |
| RECT | 1/2 chip | 2 | 1 |
| damping rate 0.4 | 1/4 chip | 3 | 0 |
| damping rate 0.4 | 1/2 chip | 3 | 0 |

The shift information is transmitted from the circuit (shift), at each symbol and for each code, in a serial and parallel form, via the port rxt_shift1 for the two low weight bits (rxt_shift (0), then rxt_shift(1)) and the port rxt_shiftm for the two high weight bits (rxt_shift(2), then rxt_shift (3)).

The internal clock rxt_ckint is transmitted from the circuit via the port rxt_ck.

The local symbol clock is transmitted to the exterior in the form of a validation signal rxt_ensymb, of duration two periods of the internal clock (rxt_ckint) of the traffic control stage 42. This validation signal rxt_ensymb permits marking the information bits relating to the code 0: rxt_data, rxt_shift1, rxt_shiftm, rxt_powcmd.

The signal rxt_endata permits marking the information relating to the codes validated by the mask mask_rx.

Internal signals (dotcross, cor_m, cor_e, cor_l, pow_m, pow_e, pow_l, powj, rimp_m, rimp_el) may be transmitted via the port rxt_ts so as to display them on an oscilloscope.

The circuit according to the invention is programmable via a simple interface comprising an address bus and a data bus and two control signals. The program words are grouped by bank. An address pg_ad on three bits permits selecting a bank; the words are entered in octets via a specific bus pg. The table below gives a brief description of the different programming banks.

| @ | pg_ad(2:O) | Description |
|---|---|---|
| 0 | "000" | Serial Register |
| 1 | "001" | Rx code mask |
| 2 | "010" | Tx code mask |
| 3 | "011" | Rx Acquisition code |
| 4 | "100" | Rx Traffic codes |
| 5 | "101" | Tx codes |
| 6 | "110" | Tx clock shift |
| 7 | "111" | reset |

The entries relating to the programming aspect are:
pg(7:0): input of program octets,
pg_ck: clock for taking into account information on pg toward the shift register; the rising edge is the active edge of the signal,
pg_ld: command to take new programming into account (not used for sequences),
pgad(2:0): selection of program bank.

The invention claimed is:
1. A digital transmission/reception circuit comprising:
a transmitter capable of transmitting the binary symbols and a receiver capable of receiving symbols transmitted by a source, wherein the transmitter comprises a first module adapted to generate at least one binary code for effecting the spectral spreading of symbols to be transmitted and a second module adapted to generate at least one internal clock signal for synchronizing the reception of symbols transmitted by a source, and
wherein the receiver comprises a module capable of detecting the presence of at least one new sources of transmission and capable of generating a synchronization signal and a power-based timing control signals corresponding to each new source detected.

2. A digital transmission/reception circuit adapted to be mounted on at least one source and on at least one concentrator exchanging binary symbols with the source, the circuit comprising a transmitter capable of transmitting the binary symbols and a receiver capable of receiving symbols transmitted by a source, the circuit being characterized in that the transmitter comprises a first module adapted to generate at least one binary code for effecting the spectral spreading of symbols to be transmitted and a second module adapted to generate at least one internal clock signal for synchronizing the reception of symbols transmitted by a source, and in that the receiver comprises a first receiver module capable of detecting new sources of transmission and a second receiver module capable of generating synchronization signals and power control signals corresponding to each new source detected, wherein the receiver comprises an input stage, an acquisition control stage, and a traffic control stage, the input stage comprising a block capable of shaping received signals, a pulse filter adapted to limit the spectrum of the received signals, a stage capable of sampling the filtered signals and transmitting the filtered data, on the one hand, to the acquisition control stage which is adapted to extract from the said filtered data the power and time shift information of the received symbols with respect to a base clock of the receiver, and on the other hand, to the traffic control stage which is adapted to extract from the filtered data the transmitted binary information and the power and time shift data of the received symbols with respect to the base clock of the receiver.

3. Circuit according to claim 2, wherein the acquisition control stage comprises a first differential demodulation module, a module capable of generating an acquisition signal representing synchronization signals and power control signals corresponding to each new transmission source, a module capable of processing the generated acquisition signal, and a first clock control block.

4. Circuit according to claim 2, wherein the traffic control stage comprises a module capable of correlation of previously processed data with the codes associated with these data, a module capable of differential demodulation of the correlated data, a calculation module capable of determining the synchronization signals and the power control signals corresponding to each detected transmission source.

5. A digital transmission/reception circuit, the circuit comprising:
a transmitter capable of transmitting symbols; and
a receiver capable of receiving one or more signals containing symbols, wherein the transmitter comprises:
a first module adapted to generate at least one binary code for spectral spreading of symbols to be transmitted; and
a second module adapted to generate at least one internal clock signal for synchronizing reception of symbols at the receiver; and wherein the receiver comprises:
a source detection module adapted to detect presence of symbols from one or more sources; and
a synchronization module adapted to generate at least one synchronization signal and at least one power-based timing control signal associated with at least one new source detected.

6. The circuit according to claim 5, wherein said source detection module comprises:
a selection module; and
a filtering module to be coupled to an output of the selection module.

7. The circuit according to claim 6, wherein the source detection module further comprises:
a thresholding module coupled to an output of the filtering module.

8. The circuit according to claim 5, wherein the synchronization module comprises:
a set of sliding correlators to perform correlations on received in-phase and quadrature signal components and to provide correlation outputs, wherein one or more outputs are represent phase shifts relative to another correlation output; and
a power computation module to determine a power corresponding to each of the correlation outputs.

9. The circuit according to claim 8, wherein the synchronization module further comprises:
a power command module to determine a power command based on one of said correlation outputs.

10. The circuit according to claim 8, wherein the synchronization module further comprises:
a clock shift module to compute a clock shift based on a combination of the powers corresponding to the correlation outputs.

11. A digital reception circuit adapted to receive one or more spread-spectrum signals spread using at least one binary code, the one or more signals containing symbols, the circuit comprising:
a source detection module adapted to detect presence of symbols from one or more sources; and
a synchronization module adapted to generate at least one synchronization signal and at least one power-based timing control signal associated with at least one new source detected.

12. The circuit according to claim 11, wherein said source detection module comprises:
a selection module; and
a filtering module to be coupled to an output of the selection module.

13. The circuit according to claim 12, wherein the source detection module further comprises:
a thresholding module coupled to an output of the filtering module.

14. The circuit according to claim 11, wherein the synchronization module comprises:
a set of sliding correlators to perform correlations on received in-phase and quadrature signal components and to provide correlation outputs, wherein one or more outputs represent phase shifts relative to another correlation output; and
a power computation module to determine a power corresponding to each of the correlation outputs.

15. The circuit according to claim 14, wherein the synchronization module further comprises:
a power command module to determine a power command based on one of said correlation outputs.

16. The circuit according to claim 14, wherein the synchronization module further comprises:
a clock shift module to compute a clock shift based on a combination of the powers corresponding to the correlation outputs.

17. A method comprising:
receiving one or more spread-spectrum signals spread using at least one binary code, the one or more signals containing symbols;
detecting the presence of symbols from one or more sources in the one or more signals; and
generating at least one synchronization signal and at least one power-based timing control signal associated with at least one new source detected in said detecting.

18. The method according to claim 17, wherein said detecting comprises:
selecting a signal for acquisition, resulting in a selected signal; and filtering the selected signal to obtain a filtered selected signal.

19. The method according to claim 18, wherein said detecting further comprises:
performing a thresholding operation on the filtered selected signal.

20. The method according to claim 17, wherein said generating comprises:
perform sliding correlations on received in-phase and quadrature signal components to provide correlation outputs, wherein one or more correlation outputs represent phase shifts relative to another correlation output; and
determining a power corresponding to each of the correlation outputs.

21. The method according to claim 20, wherein said generating further comprises:
determining a power command based on one of said correlation outputs.

22. The method according to claim 20, wherein said generating further comprises:
computing a clock shift based on a combination of the powers corresponding to the correlation outputs.

* * * * *